Patented Oct. 7, 1941

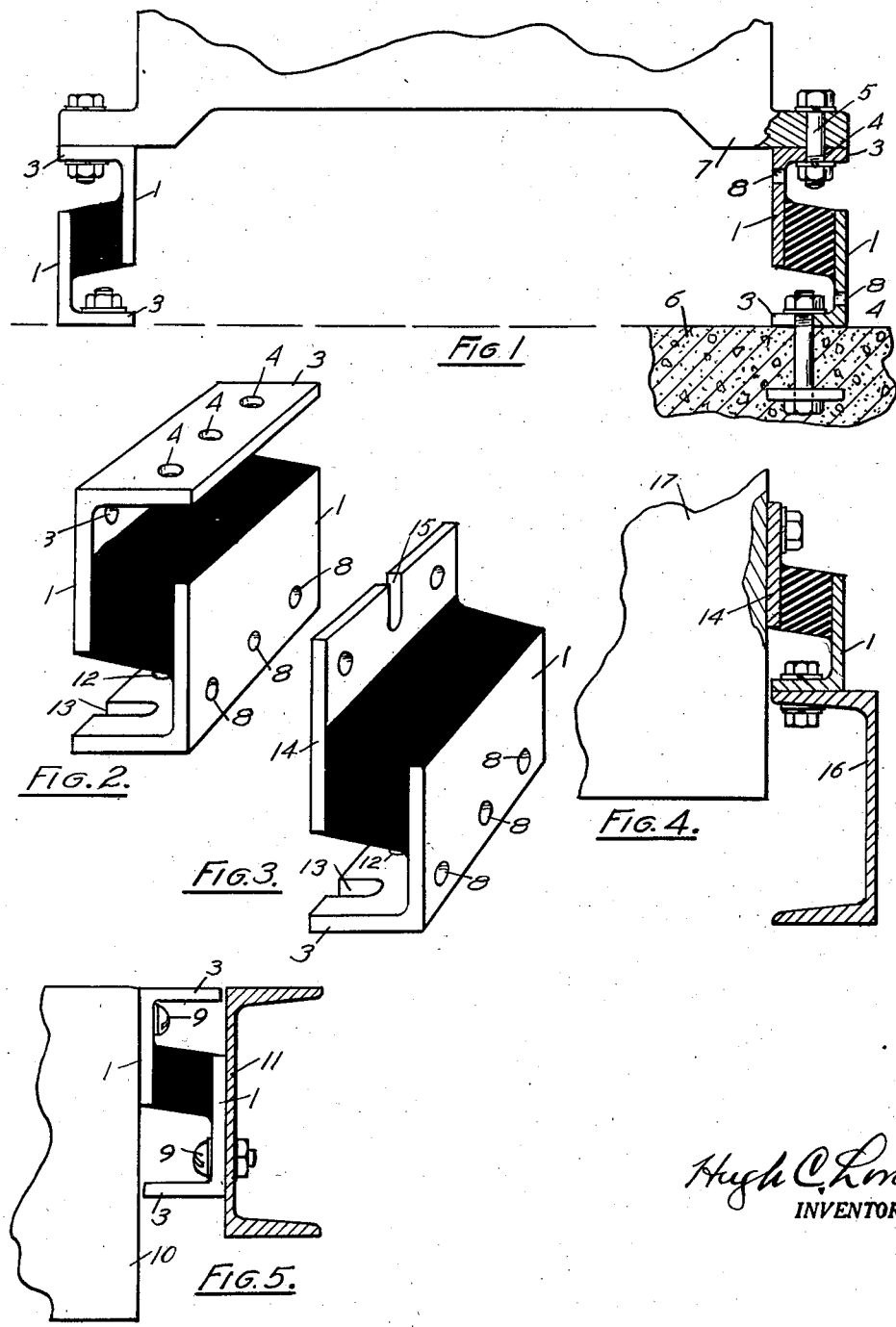

2,257,804

UNITED STATES PATENT OFFICE 2,257,804

JOINT

Hugh C. Lord, Erie, Pa., assignor to Lord Manufacturing Company, Erie, Pa., a corporation of Pennsylvania Application April 17, 1939, Serial No. 268,187

5 Claims. (Cl. 248—358)

The present invention is designed to provide joints which may be readily attached, particularly in environments where space is essential. It is particularly advantageous in supporting vibrating members where vibration or insulation is desired. Features and details of the invention will appear from the specification and claims.

Preferred embodiments of the invention are illustrated in the accompanying drawing as follows:

Fig. 1 shows a section in which the joints are in place on a supporting member supporting a supported member.

Fig. 2 an enlarged perspective view of the joint illustrated in Fig. 1.

Fig. 3 a perspective view of a modification.

Fig. 4 a section showing the application of the modification illustrated in Fig. 3.

Fig. 5 a section showing a modified attachment of the structure shown in Fig. 1.

1—1 marks side plates which may be of any extent desired, these plates presenting opposing surfaces; 2 a yielding member of rubber-like material bonded to the opposing surfaces of the plates 1—1. The plates 1—1 have the angle extensions 3—3 which are spaced from the member 2 and which are provided with perforations 4 by means of which the extensions may be attached by means of a bolt 5 to the supporting and supported members 6 and 7. The plates 1—1 also have perforations 8 providing for attachment of the plates through screws 9—9 as indicated, to the supporting and supported members such as 10 and 11, illustrated in Fig. 5.

Preferably the angles 3 do not extend beyond the planes of the outer surfaces of the opposing plate so that the structure as a whole is only limited by the distance between the outer faces of the plates. The plates 1 also have perforations 12 or slots 13.

In the modification shown in Fig. 3 a plate 14 is substituted for one of the plates 1. In this structure the plate 14 has no angle extension and the slot 15 extends to the edge of the plate. The structure illustrated in the modification of Fig. 3 may be attached to supporting and supported members 16 and 17 as shown in Fig. 4.

What I claim as new is:

1. A joint comprising opposing flat plates and a member of rubber-like material bridging the space between the plates and bonded to the opposing faces of the plates, each plate being confined to the space inwardly from the plane of its outer surface and one of the plates having an angle extension spaced from the member and having means for attachment in the angle extension and in the portion of the plate between the member and the extension.

2. A joint comprising opposing flat plates and a member of rubber-like material bridging the space between the plates and bonded to the opposing faces of the plates, each plate being confined to the space inwardly from the plane of the outer surface of the plate and each plate having an angle extension spaced from the member the angle extensions being on opposite sides of the member.

3. A joint comprising opposing flat plates and a member of rubber-like material bridging the space between the plates and bonded to the opposing faces of the plates, each plate being confined to the space inwardly from the plane of the outer surface of the plate and having an angle extension spaced from the member at the opposite side from that of the companion plate and means for attachment of the angle extension for securing the member into face engagement with a support.

4. A joint comprising opposing flat plates and a member of rubber-like material bridging the space between the plates and bonded to the opposing faces of the plates, each plate being confined to the space inwardly from the planes of the outer surfaces of both plates and having an angle extension spaced from the member; and means provided for attachment of the angle extensions in the spaces between the extensions and the member.

5. A joint comprising opposing flat plates and a member of rubber-like material bridging the space between the plates and bonded to the opposing faces of the plates, each plate being confined to the space inwardly from the plane of the outer surface of the plate and having an angle extension spaced from the member and means for attachment thereof for securing the plate into face engagement with a support, the extension with its means being confined to space between the planes of the outer surfaces of the plates.

HUGH C. LORD.